United States Patent
Lewis

(10) Patent No.: US 7,540,185 B2
(45) Date of Patent: Jun. 2, 2009

(54) SYSTEM AND METHOD FOR DETECTING ENGINE MISFIRES

(75) Inventor: Dennis J. Lewis, Long Beach, CA (US)

(73) Assignee: Toyota Motor Engineering & Manufacturing north America, Inc., Erlanger, KY (US)

(*) Notice: Subject to any disclaimer, the term of this patent is extended or adjusted under 35 U.S.C. 154(b) by 15 days.

(21) Appl. No.: 11/670,084

(22) Filed: Feb. 1, 2007

(65) Prior Publication Data
US 2008/0189023 A1    Aug. 7, 2008

(51) Int. Cl.
G01M 15/11    (2006.01)
(52) U.S. Cl. .................................. 73/114.04
(58) Field of Classification Search ............ 73/114.02, 73/114.03, 114.04, 114.05
See application file for complete search history.

(56) References Cited

U.S. PATENT DOCUMENTS

| | | | |
|---|---|---|---|
| 5,503,007 A | 4/1996 | Plee et al. | |
| 5,542,291 A | 8/1996 | James | |
| 5,561,600 A | 10/1996 | McCombie | |
| 5,862,507 A | 1/1999 | Wu et al. | |
| 5,909,724 A | 6/1999 | Nishimura et al. | |
| 6,006,155 A | 12/1999 | Wu et al. | |
| 6,070,567 A | 6/2000 | Kakizaki et al. | |
| 6,658,346 B2 | 12/2003 | Maegawa | |
| 6,978,666 B1 | 12/2005 | Wu et al. | |
| 7,142,972 B1 | 11/2006 | Naik | |
| 2002/0016666 A1* | 2/2002 | Maegawa | 701/111 |
| 2004/0144165 A1* | 7/2004 | Yamada et al. | 73/118.1 |
| 2006/0101902 A1 | 5/2006 | Christensen | |
| 2007/0137289 A1* | 6/2007 | Mathews et al. | 73/118.1 |
| 2007/0157713 A1* | 7/2007 | Tsukamoto et al. | 73/117.3 |

* cited by examiner

Primary Examiner—Eric S McCall
(74) Attorney, Agent, or Firm—Gifford, Krass, Sprinkle & Citkowski, P.C.

(57) ABSTRACT

A method and system for detecting engine misfires in a multi-cylinder internal combustion engine. The system includes a processor and a crankshaft sensor which produces an output signal to the processor representative of the angular position of the crankshaft. The processor is programmed to determine a first velocity difference between a first set of angularly spaced angular ranges of the crankshaft as well as a second velocity difference between a second set of angularly spaced angular ranges of the crankshaft. The first and second angular ranges are different from each other. The processor compares the absolute value of the greater of the first and second velocity differences with a threshold value and generates an engine misfire signal whenever that threshold is exceeded.

21 Claims, 4 Drawing Sheets

SYSTEM AND METHOD FOR DETECTING ENGINE MISFIRES

BACKGROUND OF THE INVENTION

I. Field of the Invention

The present invention relates generally to a method and system for detecting engine misfires.

II. Description of Related Art

In modern day internal combustion engines of the type used in automotive vehicles, it is oftentimes desirable to detect engine misfires in one or more of the engine cylinders. Such misfire detection enables the fuel supply to the misfiring cylinder to be terminated and, if desired, the appropriate warning signal provided to the vehicle operator.

There have been previously known systems for detecting engine misfires based upon the acceleration or deceleration of the engine crankshaft during operation of the engine. For example, an engine crankshaft acceleration following the expected ignition in a particular engine cylinder would be indicative that that cylinder is operating normally. Conversely, a deceleration of the engine crankshaft following an expected ignition in a particular cylinder would be indicative that a misfire has occurred in that cylinder.

In order to monitor the crankshaft speed, a timing wheel is mechanically coupled to the crankshaft so that the timing wheel rotates in synchronism with the crankshaft. A position sensor mounted to the engine then detects the position of the timing wheel and provides an output signal representative of the angular position of the crankshaft to a processor. Consequently, the crankshaft rotational speed is then determined as a function of the amount of time required by the timing wheel, and thus the crankshaft, to rotate through a selected angular range. The rotational speed of the crankshaft is then compared with the immediately previously determined rotational speed of the crankshaft to determine the acceleration or deceleration of the engine crankshaft.

Once a deceleration of the engine crankshaft, indicative of a cylinder misfire, is detected, the processor compares the amount of deceleration with a preset threshold. In the event that the deceleration exceeds that threshold, the processor generates the appropriate misfire output signal which may be used for various purposes. For example, the engine misfire signal may be used to terminate the fuel supply to the misfiring cylinder, activate the appropriate warning signal for the vehicle operator, etc.

These previously known methods and systems for detecting engine misfire, however, have not proven wholly satisfactory in operation. In particular, under certain load and speed conditions for the engine, a cylinder misfire does not result in deceleration of the engine crankshaft in an amount sufficient to exceed the preset threshold value so that the processor does not generate the desired engine misfire signal. The precise reason for this is unknown, but it may result from engine harmonics during operation of the engine.

SUMMARY OF THE PRESENT INVENTION

The present invention provides both a system and a method for detecting cylinder misfires of an internal combustion engine which overcomes the above-mentioned disadvantages of the previously known engine misfire detection systems.

In brief, the system of the present invention is provided for use in conjunction with an internal combustion engine of the type used in automotive vehicles. As such, the internal combustion engine includes a plurality of engine cylinders each of which defines an engine combustion chamber. A piston is reciprocally disposed in each cylinder and the pistons are mechanically coupled to a rotary crankshaft.

The engine misfire detection system of the present invention includes a processor, such as a microprocessor. A crankshaft sensor is associated with a timing wheel on the crankshaft so that the sensor produces an output signal to the processor representative of the angular position of the crankshaft.

The processor is programmed to determine a first velocity difference between a first, second and preferably third set of angularly spaced angular ranges of the crankshaft and in which the first, second and third set of angular ranges all differ from each other. For example, the first set of angular ranges preferably comprises 120 degrees of crankshaft rotation before and after an expected engine cylinder combustion. Conversely, the second set of angular ranges may comprise 90 degrees of angular rotation of the crankshaft both before and after the expected engine combustion while the third set of angular ranges may comprise 30 degrees of crankshaft rotation preceding and following the expected cylinder combustion.

In the event of an engine misfire the engine crankshaft experiences a deceleration in its angular rotational speed. This deceleration will, in turn, result in somewhat different amounts of deceleration for the engine crankshaft in each of the three sets of angular ranges depending upon engine speed and load conditions. The processor determines the magnitude of the largest deceleration of the two and preferably three angular ranges for each expected cylinder combustion and then compares the absolute value of that largest deceleration to a preset threshold value. In the event that the threshold value is exceeded, the engine processor generates an engine misfire signal.

In practice it has been found that, by detecting the crankshaft deceleration over at least two and preferably three different angular ranges, at least one of the deceleration amounts will exceed a preset threshold regardless of the engine operating condition.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
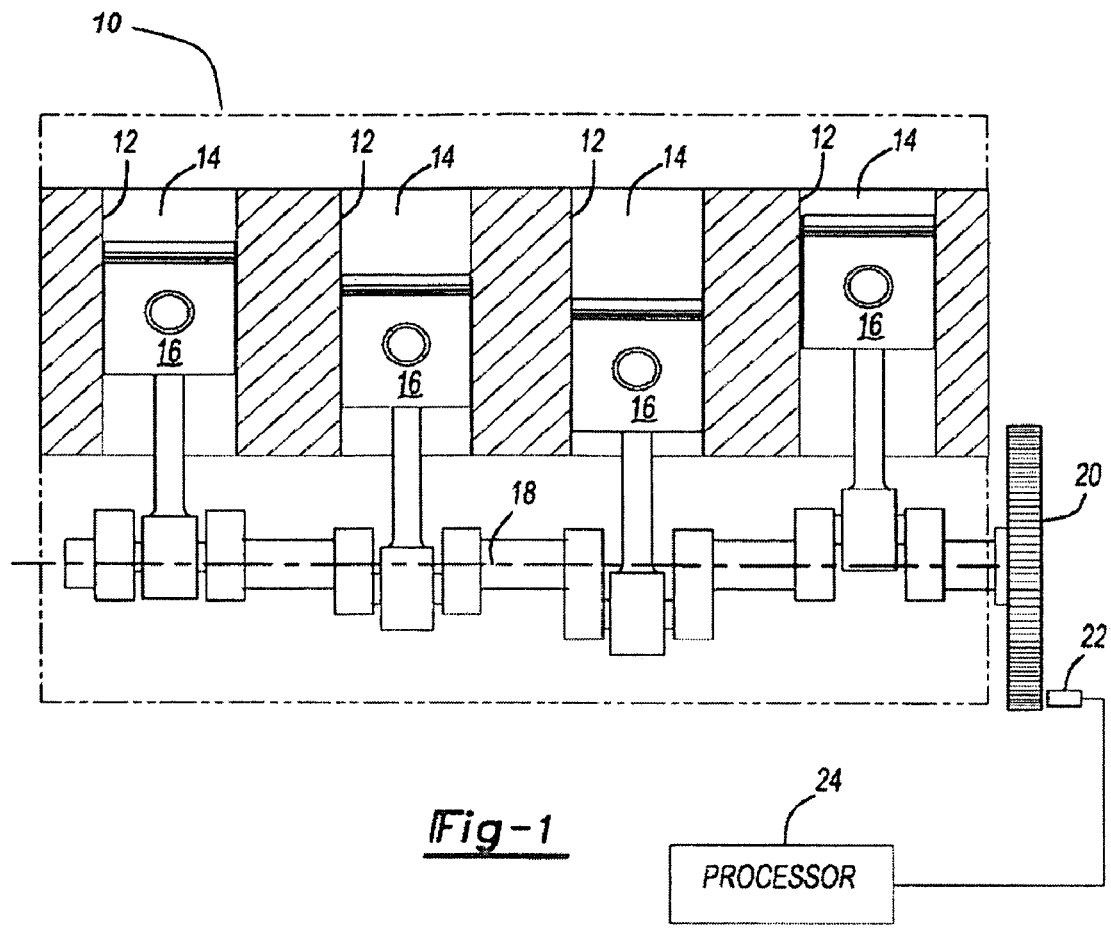
FIG. 1 is an exemplary diagrammatic view of an internal combustion engine utilizing a preferred embodiment of the present invention.

With reference first to FIG. 1, a diagrammatic view of a four-cylinder bank of an eight-cylinder internal combustion engine 10 of the type used in automotive vehicles is illustrated. The engine 10 includes a plurality of engine cylinders 12, each of which defines an internal combustion chamber 14.

A piston 16 is reciprocally slidably mounted within each engine cylinder 12. Each piston 16, in turn, is mechanically coupled to a crankshaft 18 so that reciprocation of the pistons 16 within their cylinders 12 results in rotary drive of the crankshaft 18.

A timing wheel 20 is mechanically coupled to the crankshaft 18 so that the timing wheel 20 rotates in synchronism with the crankshaft 18. For example, the timing wheel 20 may comprise a 36-tooth gear wheel so that the spacing between each tooth on the timing wheel 20 correlates to a 10 degree rotation of the crankshaft 18. A conventional sensor 22 is associated with the timing wheel 20 such that the sensor 22 provides an output signal to a processor 24 representative of the angular position of the crankshaft 18. Preferably, the processor 24 is microprocessor based.

Figure 2:
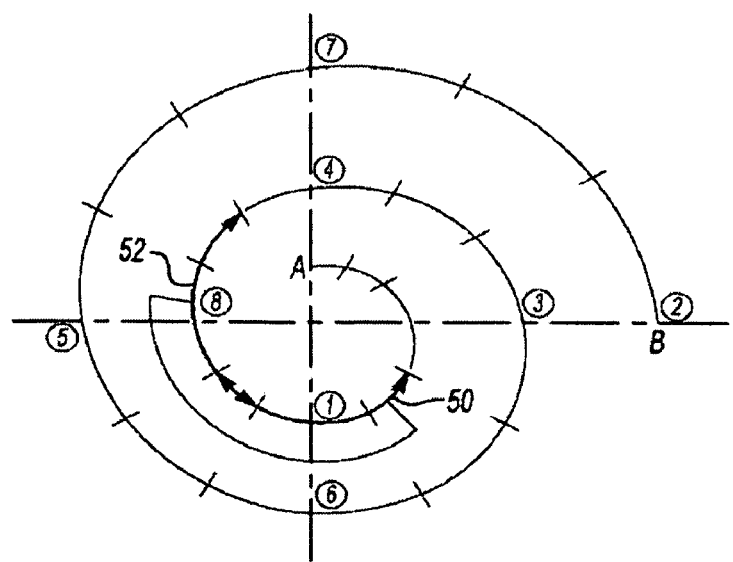
FIG. 2-FIG. 4 are exemplary engine firing diagrams.

The engine 10 is illustrated in FIG. 1 of one bank of an eight-cylinder internal combustion engine. It will be understood, of course, that the method and system of the present invention may be employed with an internal combustion engine having any number of cylinders. With reference now to FIG. 2, a crankshaft ignition timing diagram is shown for two and one-quarter revolutions of the engine crankshaft beginning at point A and ending at point B. Each expected cylinder ignition is denoted in FIG. 2 by the cylinder or combustion chamber number in a circle. Consequently, ignition in cylinder number one is expected 180 degrees after point A, ignition in cylinder number eight is expected 270 degrees after initiation at point A, ignition is expected in cylinder number four at 360 degrees following point A, and so forth. Furthermore, the automotive engine is a four-cycle engine so that two complete revolutions of the crankshaft are required in order to achieve, or at least expect, combustion in each of the cylinders.

For exemplary purposes only, the present invention will be described with respect to a misfire in engine cylinder number one. It will be understood, however, that the method and system of the present invention sequentially and iteratively performs the method disclosed below for each expected cylinder combustion during rotation of the crankshaft.

Figure 7:
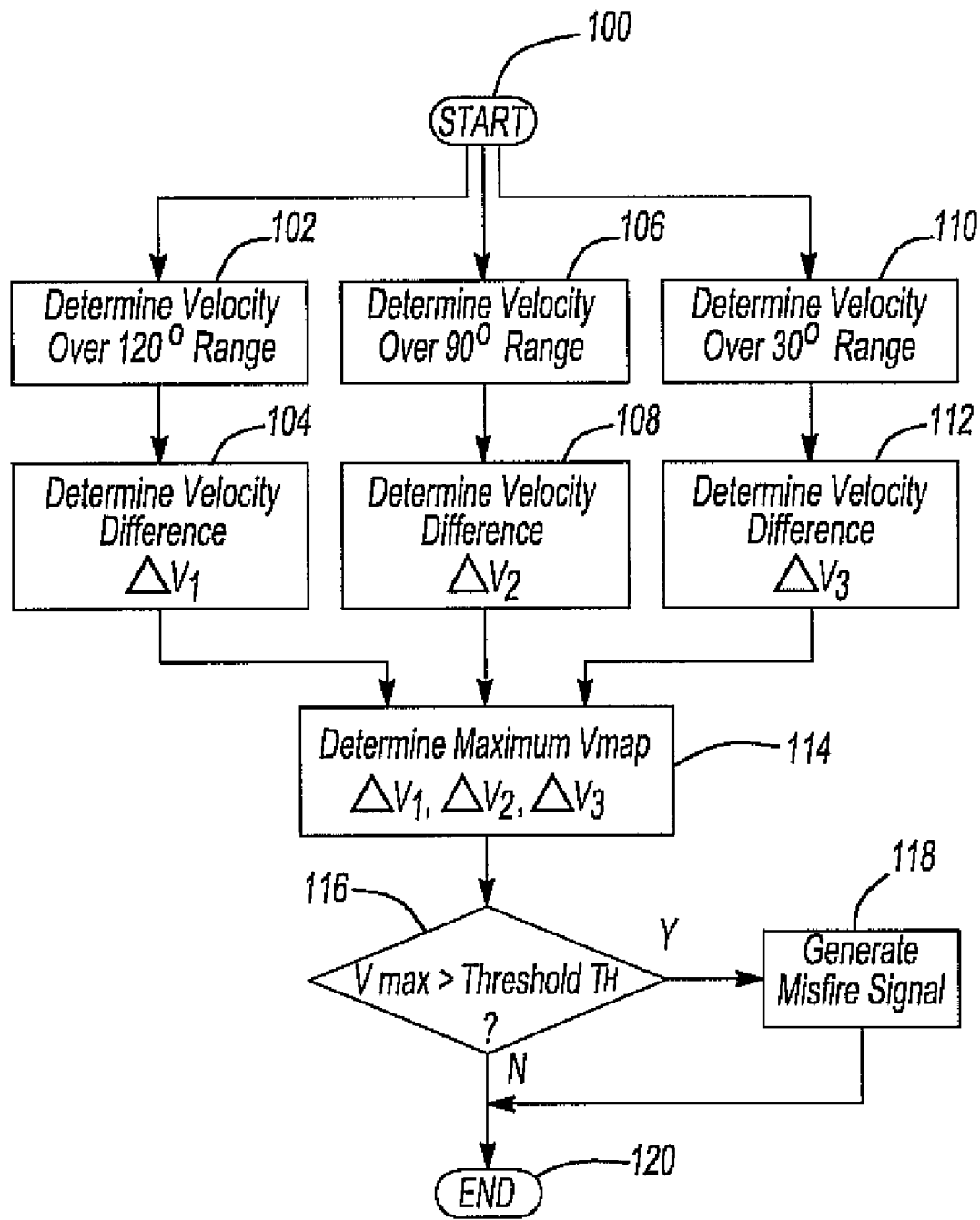
FIG. 7 is a flowchart illustrating the operation of the preferred embodiment of the present invention.

With reference then to FIGS. 1 and 7, FIG. 2 illustrates a first set of angularly spaced angular ranges 50 and 52 each of which extends for 120 degrees of rotation of the crankshaft 18. The first range 50 begins 120 degrees after initiation of rotation at point A and ends 240 degrees after point A. The second angular range 52 begins 210 degrees after point A and continues until 330 degrees after point A. The ranges 50 and 52, furthermore, overlap each other for about 30 degrees. In addition, FIG. 7 is a simplified flowchart illustrating the operation of the processor 24.

With reference to FIGS. 1, 2 and 7, after initiation of the program for the processor 24 at step 100, step 102 determines the average angular velocity of the crankshaft for both ranges 50 and 52 at step 102. Since the angular rotation of the crankshaft is directly proportional to the elapsed time of the crankshaft rotation from the beginning and to the end of each range 50 and 52, any deceleration of the crankshaft from the angular range 50 and to the angular range 52 may be easily determined by subtracting the elapsed time of the crankshaft during the first angular range 50 from the elapsed time of the crankshaft during the angular range 52. This is determined by the processor 24 at step 104.

The average velocity of the crankshaft in the first angular range 50 represents the crankshaft speed before or at the expected ignition in cylinder number one. Consequently, in the event of a misfire in cylinder number one, a deceleration of the crankshaft from the angular range 50 and to the angular range 52 would be expected. That difference of velocity is stored by the processor 24 as $\Delta V_1$ at step 104.

Figure 3:
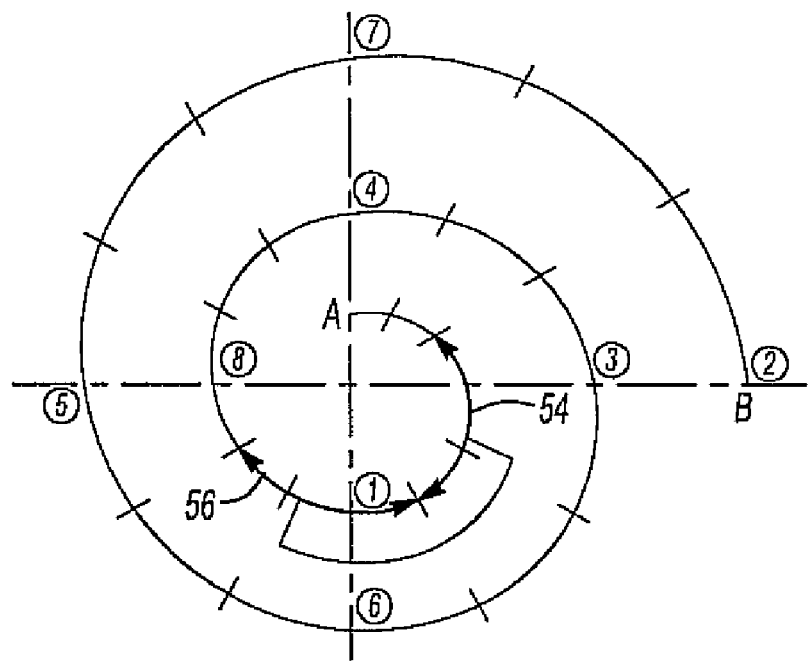

With reference now to FIGS. 2, 3 and 7, concurrently with determining the velocity difference between the first and second angular ranges 50 and 52 of the first set of 120 degrees angular range, the processor 24 also determines at step 106 the average velocity over a second set of angular ranges, each extending for a 90 degree angular rotation of the crankshaft. A first range 54 in the second set begins at 60 degrees following crankshaft rotation at point A and ends 150 degrees after point A. Similarly, a second range 56 in the second set begins 150 degrees after point A and continues until 240 degrees after point A.

Consequently, the average velocity of the crankshaft in the first range 54 of the second set of ranges would occur prior to the expected ignition in cylinder number one. Conversely, the average velocity during the second range 56 in the second set of ranges would correspond to the average velocity of the crankshaft following ignition in cylinder one. Consequently, a decrease in engine speed during the angular range 56 from the angular range 54 would be indicative of an engine misfire in cylinder one.

Step 108 determines the velocity difference $\Delta V_2$ between the angular ranges 54 and 56 in the second set in the same fashion that step 104 computed the velocity difference $\Delta V_1$ for the first set of ranges, i.e. by subtracting the elapsed time of the crankshaft to travel in the first range 54 of the second set from the elapsed time of the crankshaft to travel through the angular range 56 in the second set. The processor stores the value $\Delta V_2$ for further processing in step 108.

Figure 4:
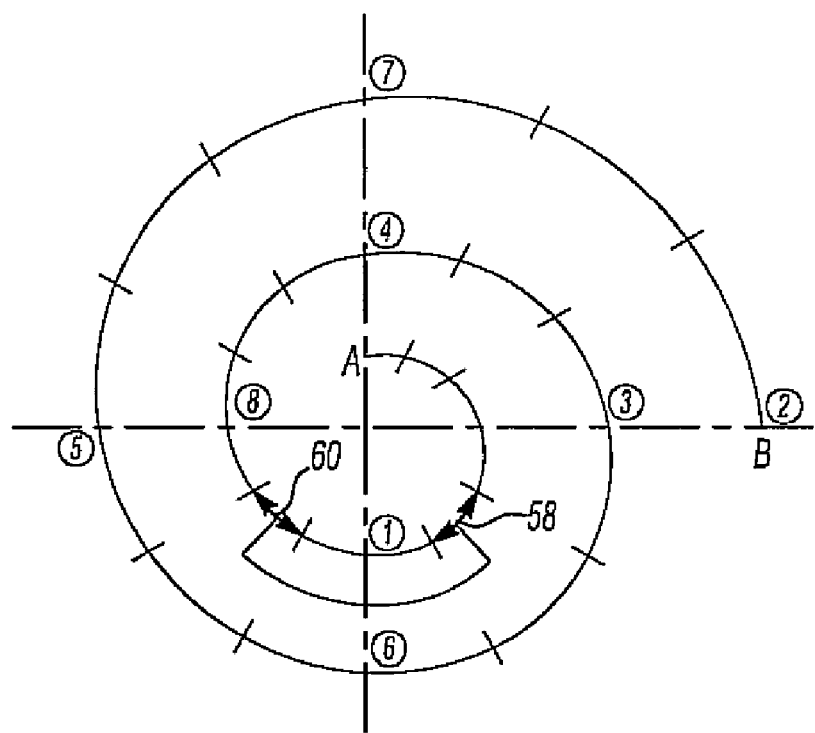

With reference now to FIGS. 4 and 7, FIG. 4 represents the crankshaft rotation ignition chart with a third set of angular ranges 58 and 60, each extending for a 30 degree rotation of the crankshaft 18. The first range 58 of the third set begins 120 degrees after point A while the second range 60 of the third set begins 210 degrees after point A.

Step 110 determines the change in average velocity $\Delta V_3$ between the first range 58 of the third set and the second range 60 of the third set by determining the elapsed time for the crankshaft to rotate through each of the ranges 58 and 60. The change in velocity $\Delta V_3$ is then determined by subtracting the crankshaft angular velocity in the angular range 58 from the velocity in the angular range 60.

The angular range 58 occurs prior to the expected ignition in cylinder number one. Conversely, the second range 60 occurs after the expected ignition in cylinder number one. Therefore, as before, a deceleration of the crankshaft from the angular range 58 and to the angular range 50 would be indicative of a misfire in cylinder number one.

It will be understood, of course, that the execution of steps 102-112 illustrated in FIG. 7 overlap each other. For example, the initiation of the timing to determine the velocity in each of the first ranges 50, 54 and 58 are all initiated before the termination of the timing of any of the first ranges 50, 54 and 56. The same is also true for the second ranges 52, 56 and 60 in each of the three sets of angular ranges.

With reference now particularly to FIG. 7, after the velocity differences $\Delta V_1$, $\Delta V_2$ and $\Delta V_3$ have been determined at steps 104, 108 and 112, the program continues to step 114 where the program determines the maximum deceleration $V_{max}$ of the three sets of angular ranges, i.e. the maximum of the absolute values of $\Delta V_1$, $\Delta V_2$ and $\Delta V_3$. Step 114 then proceeds to step 116. At step 116, the value $V_{max}$ is compared to a predetermined threshold $T_H$. If $V_{max}$ is greater than the threshold, indicative of an engine misfiring, step 116 branches to step 118 where the processor 24 generates a cylinder misfire signal and then exits at step 120. Conversely, if $V_{max}$ is less than the threshold amount, step 116 proceeds directly to step 120.

The cylinder misfire signal generated at step 118 may be used for any of several different reasons. For example, the cylinder misfire signal may be utilized to terminate the fuel flow to the misfiring cylinder. Similarly, the misfire signal may be used by the processor to provide an appropriate alert or warning signal to the vehicle operator that engine service is required.

Although the above process has been described only with respect to cylinder number one, it will be understood, of course, that the above process is repeated for each and every cylinder in the engine and then iteratively repeated during the continued rotation of the crankshaft.

Figure 5:
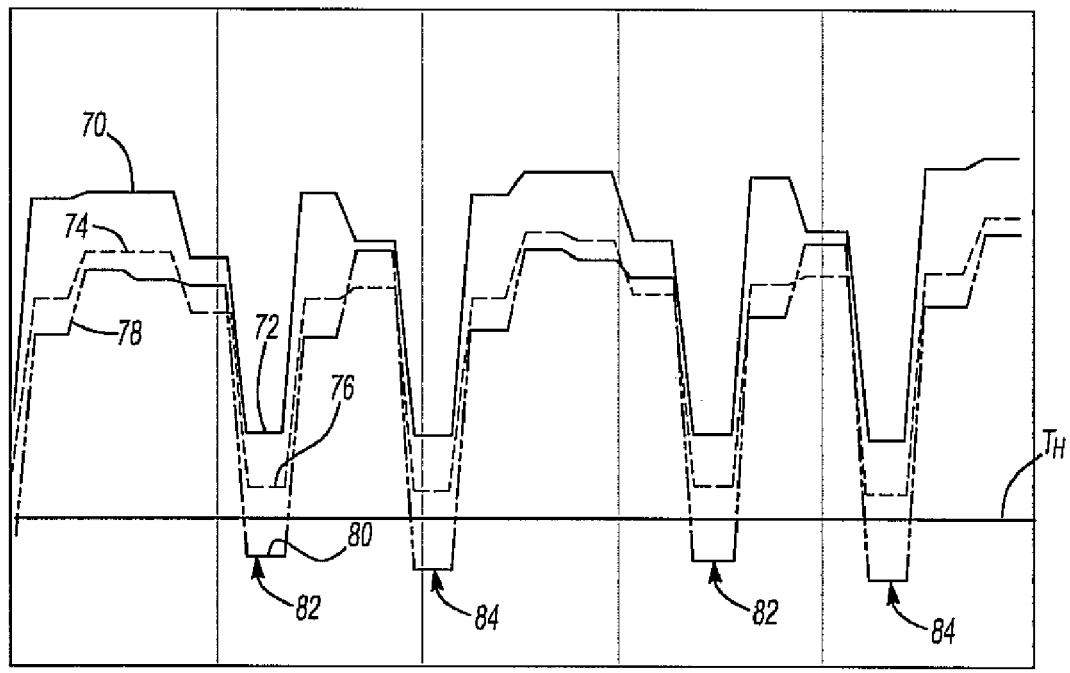
FIG. 5 is an exemplary graph illustrating a sensor output during a double cylinder misfiring condition.

With reference now to FIG. 5, an exemplary chart illustrating the crankshaft speed over four revolutions is shown with an engine misfire on both cylinder number one and cylinder number three, each of which results in a momentary deceleration of the crankshaft as shown at 82 for cylinder one and 84 for cylinder three. Graph 70 in FIG. 5 represents the crankshaft speed as determined using the first set of 120 degrees angular ranges shown in FIG. 2. The crankshaft angular velocity at its minimum 72 after the misfire, however, is greater than the threshold amount $T_H$ so that $\Delta V_1$ is less than the threshold $T_H$. Consequently, utilization of only the first set of angular ranges of 120 degrees (FIG. 2) would not result in a detection of the engine misfiring of cylinder one or three.

Still referring to FIG. 5, graph 74 represents the crankshaft velocity as measured over the second set of 90 degree angular range (FIG. 3). In this case, a minimum 76 of the crankshaft angular velocity is greater than the threshold amount $T_H$ and also would not result in the generation of the engine misfire signal by the processor 24.

The third graph 78 is representative of the crankshaft angular velocity utilizing the third set of 30 degrees angular range (FIG. 4). In this case, the crankshaft velocity falls to a minimum 80 below the threshold $T_H$ which generates a cylinder misfire signal. In this situation, furthermore, step 114 (FIG. 7) would select the maximum velocity difference $\Delta V_3$ as the value $V_{max}$ for use in step 116 of the program to determine if $V_{max}$, i.e. the velocity change, is greater than the threshold $T_H$.

Figure 6:
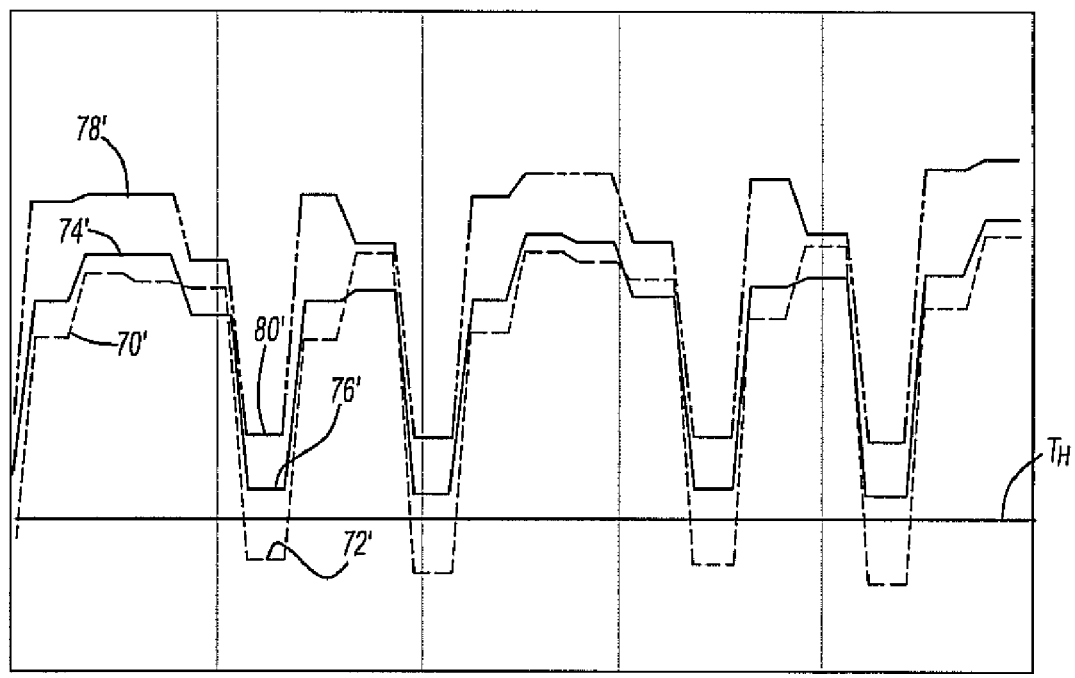
FIG. 6 is a graph similar to FIG. 5, but illustrating the sensor output of a multiple engine misfiring condition similar to FIG. 5, but under different load and speed conditions of the engine.

With reference now to FIG. 6, a crankshaft velocity chart similar to FIG. 5 is shown, but at a different engine rotational speed and/or load condition and numbers 70', 74' and 78' represent the angular speed of the crankshaft as measured during a 120 degree, 90 degree and 30 degree rotation and having minimum crankshaft velocities 72', 76' and 80', respectively. Under these speed and/or load conditions, the velocity difference $\Delta V_3$ determined during the third set of 30 degree angular ranges (FIG. 4) has less of an impact than the crankshaft angular velocity as measured during the other two sets of angular ranges of 90 and 120 degrees, respectively. Furthermore, the crankshaft speed of graph 78' is greater than the threshold amount $T_H$ so that $\Delta V_3$ is less than the threshold $T_H$ and an engine misfire signal would not be produced if only $\Delta V_3$ were measured. Conversely, when the crankshaft velocity is measured over the 120 degree angular range as shown by graph 70', the crankshaft speed 72' following the misfire is less than the threshold $T_H$ so that $\Delta V_3$ is greater than the threshold $T_H$, and the processor generates the engine misfire signal.

From the foregoing, it can be seen that the present invention provides a system and method for detecting one or more engine misfires which is highly accurate under a plurality of different operating conditions. In particular, by measuring the change in velocity of the crankshaft over at least two different angular ranges, and preferably three different angular ranges, the likelihood that an engine misfire will be detected at all engine operating conditions is greatly enhanced.

The present invention has been described as measuring the change in the crankshaft angular velocity over a first set of spaced 120 degree rotation ranges, a second set of spaced 90 degree rotation ranges and a third set of spaced 30 degree rotation range of the crankshaft. It will be understood, of course, that this is by way of example only and that different angular ranges may be utilized without deviation from either the spirit or scope of the invention. Rather, it is only necessary to have at least two different angular ranges that differ from each other, and preferably three.

Having described my invention, however, many modifications will become apparent to those of skill in the art to which it pertains without deviation from the spirit of the invention as defined by the scope of the appended claims.

I claim:

1. For use in conjunction with an internal combustion engine having a plurality of combustion chambers and a piston reciprocally disposed in each cylinder, said pistons being mechanically coupled to a rotary crankshaft, a system for detecting one or more engine misfires in one or more cylinders comprising:
    a processor,
    a crankshaft sensor which produces an output signal to said processor representative of the angular position of the crankshaft,
    said processor being programmed to determine a first velocity difference between a first set of angularly spaced angular ranges of the crankshaft and a second velocity difference between a second set of angularly spaced angular ranges of the crankshaft, said first and second set of angular ranges being different from each other and together extending less than one revolution of the crankshaft,
    said processor generating an engine misfire signal whenever an absolute value of either of said first and second velocity difference exceeds a threshold value.

2. The invention as defined in claim 1 wherein said first and second set of angular ranges overlap each other.

3. The invention as defined in claim 1 wherein said first and second set of angular ranges overlap each other.

4. The invention as defined in claim 1 wherein each of said first set of angularly spaced ranges extends over about 30 degrees of rotation of the crankshaft.

5. The invention as defined in claim 4 wherein each of said second set of angularly spaced ranges extends over about 60 degrees of rotation of the crankshaft.

6. The invention as defined in claim 1 wherein said processor is programmed to determine a third velocity difference between a third set of angularly spaced angular ranges of the crankshaft, said third set of angular ranges being different from said first and second set of angular ranges,
    said processor generating an engine misfire signal whenever an absolute value of either of said first, second or third velocity difference exceeds a threshold value.

7. The invention as defined in claim 6 wherein each of said first set of angularly spaced ranges extends over about 30 degrees of rotation of the crankshaft.

8. The invention as defined in claim 7 wherein each of said second set of angularly spaced ranges extends over about 60 degrees of rotation of the crankshaft.

9. The invention as defined in claim 8 wherein each of said third set of angularly spaced ranges extends over about 90 degrees of rotation of the crankshaft.

10. For use in conjunction with an internal combustion engine having a plurality of combustion chambers and a piston reciprocally disposed in each cylinder, said pistons being mechanically coupled to a rotary crankshaft, a method for detecting one or more engine misfires in one or more cylinders comprising the steps of:

determining a first velocity difference between a first set of angularly spaced angular ranges of the crankshaft and a second velocity difference between a second set of angularly spaced angular ranges of the crankshaft, said first and second set of angular ranges being different from each other and together extending less than one revolution of the crankshaft, generating an engine misfire signal whenever an absolute value of either of said first and second velocity difference exceeds a threshold value.

11. The invention as defined in claim 10 wherein said first and second set of angular ranges overlap each other.

12. The invention as defined in claim 10 wherein each of said first set of angularly spaced ranges extends over about 30 degrees of rotation of the crankshaft.

13. The invention as defined in claim 12 wherein each of said second set of angularly spaced ranges extends over about 60 degrees of rotation of the crankshaft.

14. The invention as defined in claim 10 and further comprising the steps of:

determining a third velocity difference between a third set of angularly spaced angular ranges of the crankshaft, said third range being different from said first and second set of angular ranges, determining a maximum of the absolute value of said first, second and third velocity differences, and wherein said comparing step comprises the step of comparing said maximum to said threshold value.

15. The invention as defined in claim 14 wherein each of said first set of angularly spaced ranges extends over about 30 degrees of rotation of the crankshaft.

16. The invention as defined in claim 15 wherein each of said second set of angularly spaced ranges extends over about 60 degrees of rotation of the crankshaft.

17. The invention as defined in claim 16 wherein each of said third set of angularly spaced ranges extends over about 90 degrees of rotation of the crankshaft.

18. For use in conjunction with an internal combustion engine having a plurality of combustion chambers and a piston reciprocally disposed in each cylinder, said pistons being mechanically coupled to a rotary crankshaft, a method for detecting one or more engine misfires in one or more cylinders comprising the steps of:

determining a first velocity difference between a first set of angularly spaced angular ranges of the crankshaft and a second velocity difference between a second set of angularly spaced angular ranges of the crankshaft, said first and second set of angular ranges being different from each other, generating an engine misfire signal whenever an absolute value of either of said first and second velocity difference exceeds a threshold value, determining a third velocity difference between a third set of angularly spaced angular ranges of the crankshaft, said third range being different from said first and second set of angular ranges, determining a maximum of the absolute value of said first, second and third velocity differences, and wherein said comparing step comprises the step of comparing said maximum to said threshold value.

19. The invention as defined in claim 18 wherein each of said fast set of angularly spaced ranges extends over about 30 degrees of rotation of the crankshaft.

20. The invention as defined in claim 19 wherein each of said second set of angularly spaced ranges extends over about 60 degrees of rotation of the crankshaft.

21. The invention as defined in claim 20 wherein each of said third set of angularly spaced ranges extends over about 90 degrees of rotation of the crankshaft.

* * * * *